US012559700B2

(12) United States Patent
Izmitli et al.

(10) Patent No.: US 12,559,700 B2
(45) Date of Patent: Feb. 24, 2026

(54) METHOD OF MAKING LIQUID LAUNDRY DETERGENT FORMULATION

(71) Applicants: Dow Global Technologies LLC, Midland, MI (US); Rohm and Haas Company, Collegeville, PA (US)

(72) Inventors: Aslin Izmitli, Yardley, PA (US); Wanglin Yu, Pearland, TX (US); Timothy J. Young, Bay City, MI (US); Afua Sarpong Karikari, Bristol, PA (US); John Hayes, Douglassville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 445 days.

(21) Appl. No.: 17/908,275

(22) PCT Filed: Apr. 27, 2021

(86) PCT No.: PCT/US2021/029318

§ 371 (c)(1),
(2) Date: Aug. 31, 2022

(87) PCT Pub. No.: WO2021/222191

PCT Pub. Date: Nov. 4, 2021

(65) Prior Publication Data

US 2023/0105221 A1 Apr. 6, 2023

Related U.S. Application Data

(60) Provisional application No. 63/017,812, filed on Apr. 30, 2020.

(51) Int. Cl.

| | |
|---|---|
| ***C11D 1/83*** | (2006.01) |
| ***C11D 3/20*** | (2006.01) |
| ***C11D 3/43*** | (2006.01) |
| *C11D 1/14* | (2006.01) |
| *C11D 1/22* | (2006.01) |
| *C11D 1/722* | (2006.01) |

(52) U.S. Cl.

CPC .......... *C11D 1/8305* (2013.01); *C11D 3/2079* (2013.01); *C11D 3/2086* (2013.01); *C11D 3/43* (2013.01); *C11D 1/146* (2013.01); *C11D 1/22* (2013.01); *C11D 1/722* (2013.01); *C11D 2111/12* (2024.01)

(58) Field of Classification Search

CPC ........... C11D 1/83; C11D 1/8305; C11D 3/43; C11D 2111/12; C11D 1/72; C11D 1/722

See application file for complete search history.

(56) References Cited

U.S. PATENT DOCUMENTS

| | | | | |
|---|---|---|---|---|
| 3,557,039 | A | 1/1971 | McIntyre et al. | |
| 3,956,401 | A | 5/1976 | Scardera et al. | |
| 4,317,940 | A | 3/1982 | Scardera et al. | |
| 4,438,014 | A * | 3/1984 | Scott | C11D 1/722 510/506 |
| 4,925,587 | A | 5/1990 | Schenker et al. | |
| 5,576,281 | A | 11/1996 | Bunch et al. | |
| 5,612,305 | A * | 3/1997 | Lewis | C11D 3/0026 510/226 |
| 5,990,065 | A * | 11/1999 | Vinson | C11D 3/30 510/237 |
| 6,812,201 | B1 * | 11/2004 | Weuthen | C11D 1/83 510/474 |
| 8,697,622 | B2 * | 4/2014 | Man | D06L 1/12 510/229 |
| 9,677,033 | B2 | 6/2017 | Krasnansky et al. | |
| 9,796,948 | B2 * | 10/2017 | Shearouse | C11D 3/38636 |
| 10,150,936 | B2 | 12/2018 | Yu et al. | |
| 2013/0117946 | A1 * | 5/2013 | Dawudian | D06L 1/04 8/142 |

FOREIGN PATENT DOCUMENTS

| | | | |
|---|---|---|---|
| WO | 2019217082 | A1 | 11/2019 |

* cited by examiner

*Primary Examiner* — Mark Eashoo

(74) *Attorney, Agent, or Firm* — Thomas S. Deibert

(57) ABSTRACT

A method of making a liquid laundry detergent formulation is provided, comprising: providing a liquid carrier; providing a cleaning surfactant; and selecting a cleaning booster of Formula (I)

(I)

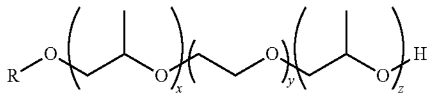

wherein x is 3 to 10; wherein y is 5 to 20; wherein z is 5 to 30; wherein $x+y+z \geq 18$; wherein $x \neq z$; wherein each R is a $C_{7-9}$ alkyl group, wherein ≥75 wt % of the R groups are branched; wherein the selected cleaning booster of Formula (I) is selected based its cleaning boosting properties; providing the selected cleaning booster of Formula (I); and combining the liquid carrier, the cleaning surfactant and the selected cleaning booster of Formula (I) to provide the liquid laundry detergent formulation.

13 Claims, No Drawings

METHOD OF MAKING LIQUID LAUNDRY DETERGENT FORMULATION

The present invention is related to a method of making a liquid laundry detergent formulation. In particular, the present invention relates to a method of making a liquid laundry detergent formulation, comprising: providing a liquid carrier; providing a cleaning surfactant; and selecting a cleaning booster of Formula (I)

(I)

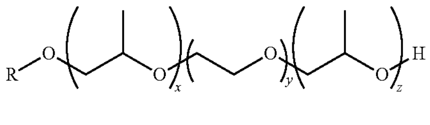

wherein x is 3 to 10; wherein y is 5 to 20; wherein z is 5 to 30; wherein $x+y+z \geq 18$; wherein $x \neq z$; wherein each R is a $C_{7-9}$ alkyl group, wherein ≥75 wt % of the R groups are branched; wherein the selected cleaning booster of Formula (I) is selected based its cleaning boosting properties; providing the selected cleaning booster of Formula (I); and combining the liquid carrier, the cleaning surfactant and the selected cleaning booster of Formula (I) to provide the liquid laundry detergent formulation.

Soil on laundry falls into two general categories; either i) clay soil comprising particles which generally comprise negatively charged layers of aluminosilicates and positively charged cations, for example $Ca^{++}$, which are positioned between the aluminosilicate layers and hold them together; or ii) oil- or grease borne soils which are typically caused by spills of frying oil, grease, tomato or spaghetti sauce, human body sweat (sebum), and non-saponifiable oil stains such as used motor oil or petroleum oils. Oil-borne stains can usually be removed by dry cleaning but this is expensive. Previously, such oily soil would have been removed using very hot (typically 60-90° C.) wash conditions, however, the current trend is to save energy and use much lower washing temperatures in the region of 15-50° C.; unfortunately, however, oily soil is not easily removed at such temperatures.

Soil release agents are known in the art for use in domestic and industrial fabric treatment processes such as laundering, stain guarding, fabric softening etc. For example, polyesters of terephthalic and other aromatic dicarboxylic acids having soil release properties are widely disclosed in the art, such as the so-called PET/POET polymers (polyethylene terephthalate/polyoxyethylene terephthalate), which have been known for over 20 years and the PET/PEG (polyethylene terephthalate/polyethylene glycol) polymers which are taught in, for example, U.S. Pat. No. 3,557,039. These PET/POET and PET/PEG polymers are known to be helpful to promote the release of oily soil particularly from synthetic fibres such as polyester. It is believed that their effectiveness is due to the affinity resulting from the similarity between the structure of the PET/POET and PET/PEG polymers and the polyester fibres. Over the last few years, the backbone and side-chains in the PET/POET and PET/PEG polymers have been modified to achieve a range of cost effective polyester soil release additives which can be formulated into liquid and solid (granular) detergents. The main drawback with these materials, however, is that they offer little or no benefit on cotton and cotton blend fabrics; a much larger quantity of polymer is required before any soil release effects are observed and the PET/POET materials, in particular, have low water solubility which makes them difficult to use.

Despite the extensive research activity in this field, there remains a need for a soil release additive which has superior soil release properties, especially oil- and grease borne soil, and which is highly effective on natural fabrics such as cotton, and cotton-blend fabrics at low temperatures under domestic laundry conditions.

The present invention provides a method of making a liquid laundry detergent formulation, comprising: providing a liquid carrier; providing a cleaning surfactant; and selecting a cleaning booster of Formula (I)

(I)

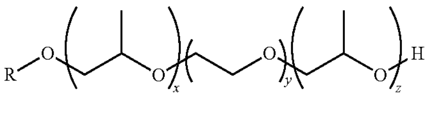

wherein x is 3 to 10; wherein y is 5 to 20; wherein z is 5 to 30; wherein $x+y+z \geq 18$; wherein $x \neq z$; wherein each R is a $C_{7-9}$ alkyl group, wherein ≥75 wt % of the R groups are branched; wherein the selected cleaning booster of Formula (I) is selected based its cleaning boosting properties; providing the selected cleaning booster of Formula (I); and combining the liquid carrier, the cleaning surfactant and the selected cleaning booster of Formula (I) to provide the liquid laundry detergent formulation.

The present invention provides a method of washing a fabric article of the present invention, comprising: providing a soiled fabric article; providing a liquid laundry detergent formulation made by the method of the present invention; providing a wash water; and applying the wash water and the liquid laundry detergent formulation to the soiled fabric to provide a cleaned fabric article; wherein the wash water is at a temperature of ≤35° C.

DETAILED DESCRIPTION

It has been surprisingly found that the materials according to Formula (I) have cleaning boosting properties that provide effective soil release benefits to liquid laundry detergent formulations comprising same, especially oil- and grease borne soil (e.g., sebum soils), from cotton containing fabrics (e.g., polycotton blends) at low temperatures (i.e., as 22° C.) and as an added benefit exhibit ready biodegradability following the procedure of OECD 301F.

Unless otherwise indicated, ratios, percentages, parts, and the like are by weight. Weight percentages (or wt %) in the composition are percentages of dry weight, i.e., excluding any water that may be present in the composition.

Preferably, the method of making a liquid laundry detergent formulation of the present invention, comprises: providing a liquid carrier; providing a cleaning surfactant; and selecting a cleaning booster of Formula (I)

(I)

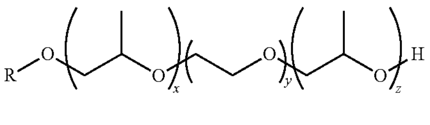

wherein x is 3 to 10 (preferably, 4 to 7; more preferably, 4 to 6; most preferably, 5); wherein y is 5 to 20 (preferably, 7 to 18; more preferably, 8 to 17; most preferably, 9 to 15);

wherein z is 5 to 30 (preferably, 9 to 30; more preferably, 10 to 28; most preferably, 16 to 26); wherein x+y+z≥18 (preferably, 20 to 60; more preferably, 21 to 28; still more preferably, 24 to 60; most preferably, 35 to 60); wherein x≠z; wherein each R is a $C_{7-9}$ alkyl group (preferably, a $C_8$ alkyl group; more preferably, a branched 2-ethylhexyl group), wherein ≥75 wt % (preferably, 80 to 100 wt %; more preferably, 90 to 100 wt %; still more preferably, 95 to 100 wt %; yet more preferably, 98 to 100 wt %; still yet more preferably, 99 to 100 wt %; most preferably, 99.5 to 100 wt %) of the R groups are branched; wherein the selected cleaning booster of Formula (I) is selected based its cleaning boosting properties; providing the selected cleaning booster of Formula (I); and combining the liquid carrier, the cleaning surfactant and the selected cleaning booster of Formula (I) to provide the liquid laundry detergent formulation.

More preferably, the method of making a liquid laundry detergent formulation of the present invention, comprises: providing a liquid carrier; providing a cleaning surfactant; and selecting a cleaning booster of Formula (I)

(I)

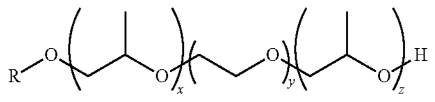

wherein x is 3 to 10 (preferably, 4 to 7; more preferably, 4 to 6; most preferably, 5); wherein y is 5 to 20 (preferably, 7 to 18; more preferably, 8 to 17; most preferably, 9 to 15); wherein z is 5 to 30 (preferably, 9 to 30; more preferably, 10 to 28; most preferably, 16 to 26); wherein x+y+z≥18 (preferably, 20 to 60; more preferably, 21 to 28; still more preferably, 24 to 60; most preferably, 35 to 60); wherein x≠z; wherein each R is a $C_{7-9}$ alkyl group (preferably, a $C_8$ alkyl group; more preferably, a branched 2-ethylhexyl group), wherein ≥75 wt % (preferably, 80 to 100 wt %; more preferably, 90 to 100 wt %; still more preferably, 95 to 100 wt %; yet more preferably, 98 to 100 wt %; still yet more preferably, 99 to 100 wt %; most preferably, 99.5 to 100 wt %) of the R groups are branched; wherein the selected cleaning booster of Formula (I) is selected based its cleaning boosting properties; providing the selected cleaning booster of Formula (I); and combining the liquid carrier, the cleaning surfactant and the selected cleaning booster of Formula (I) to provide the liquid laundry detergent formulation; wherein the liquid laundry detergent formulation provided comprises: 15 to 97.99 wt % (preferably, 40 to 94 wt %; more preferably, 45 to 90 wt %; most preferably, 47 to 71 wt %), based on weight of the liquid laundry detergent formulation, of the liquid carrier; 2 to 60 wt % (preferably, 5 to 50 wt %; more preferably, 7.5 to 45 wt %; most preferably, 35 to 40 wt %), based on weight of the liquid laundry detergent formulation, of the cleaning surfactant; and 0.01 to 25 wt % (more preferably, 1 to 10 wt %; still more preferably, 2.5 to 7.5 wt %; most preferably 4 to 6 wt %), based on weight of the liquid laundry detergent formulation, of the selected cleaning booster of Formula (I).

Preferably, the liquid laundry detergent formulation provided by the method of the present invention, comprises a liquid carrier. More preferably, the liquid laundry detergent formulation provided by the method of the present invention comprises 15 to 97.9 wt % (preferably, 40 to 94 wt %; more preferably, 45 to 75 wt %; most preferably, 47 to 71 wt %), based on weight of the liquid laundry detergent formulation, of the liquid carrier. Still more preferably, the liquid laundry detergent formulation provided by the method of the present invention comprises 15 to 97.9 wt % (preferably, 40 to 94 wt %; more preferably, 45 to 75 wt %; most preferably, 47 to 71 wt %), based on weight of the liquid laundry detergent formulation, of a liquid carrier; wherein the liquid carrier comprises water. Most preferably, the liquid laundry detergent formulation provided by the method of the present invention comprises 15 to 97.9 wt % (preferably, 40 to 94 wt %; more preferably, 45 to 75 wt %; most preferably, 47 to 71 wt %), based on weight of the liquid laundry detergent formulation, of a liquid carrier; wherein the liquid carrier is water.

Preferably, the liquid carrier used in the method of the present invention can include water miscible liquids, such as, $C_{1-3}$ alkanolamines and $C_{1-3}$ alkanols. More preferably, the liquid carrier used in the method of the present invention includes 0 to 8 wt % (preferably, 0.2 to 8 wt %; more preferably, 0.5 to 5 wt %), based on weight of the liquid carrier, of water miscible liquids; wherein the water miscible liquids are selected from the group consisting of $C_{1-3}$ alkanolamines, $C_{1-3}$ alkanols and mixtures thereof.

Preferably, the liquid laundry detergent formulation provided by the method of the present invention, comprises: a cleaning surfactant. More preferably, the liquid laundry detergent formulation provided by the method of the present invention, comprises: 2 to 60 wt % (more preferably, 5 to 50 wt %; still more preferably, 7.5 to 30 wt %; most preferably, 25 to 40 wt %), based on weight of the liquid laundry detergent formulation, of a cleaning surfactant. Still more preferably, the liquid laundry detergent formulation provided by the method of the present invention, comprises: 2 to 60 wt % (more preferably, 5 to 50 wt %; still more preferably, 7.5 to 30 wt %; most preferably, 25 to 40 wt %), based on weight of the liquid laundry detergent formulation, of a cleaning surfactant; wherein the cleaning surfactant is selected from the group consisting of anionic surfactants, nonionic surfactants, cationic surfactants, amphoteric surfactants and mixtures thereof. Yet more preferably, the liquid laundry detergent formulation provided by the method of the present invention, comprises: 2 to 60 wt % (more preferably, 5 to 50 wt %; still more preferably, 7.5 to 30 wt %; most preferably, 25 to 40 wt %), based on weight of the liquid laundry detergent formulation, of a cleaning surfactant; wherein the cleaning surfactant includes an anionic surfactants. Yet still more preferably, the liquid laundry detergent formulation provided by the method of the present invention, comprises: 2 to 60 wt % (more preferably, 5 to 50 wt %; still more preferably, 7.5 to 30 wt %; most preferably, 25 to 40 wt %), based on weight of the liquid laundry detergent formulation, of a cleaning surfactant; wherein the cleaning surfactant includes a mixture of an anionic surfactant and a non-ionic surfactant. Most preferably, the liquid laundry detergent formulation provided by the method of the present invention, comprises: 2 to 60 wt % (more preferably, 5 to 50 wt %; still more preferably, 7.5 to 30 wt %; most preferably, 25 to 40 wt %), based on weight of the liquid laundry detergent formulation, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-10}$ alkyl polyethoxy sulfates and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate, $C_{12-16}$ alkyl polyethoxy sulfate and mixtures thereof.

Non-ionic surfactants include alkoxylates (e.g., polyglycol ethers, fatty alcohol polyglycol ethers, alkylphenol polyglycol ethers, end group capped polyglycol ethers, mixed ethers, hydroxy mixed ethers, fatty acid polyglycol esters and mixtures thereof. Preferred non-ionic surfactants include fatty alcohol polyglycol ethers. More preferred non-ionic surfactants include secondary alcohol ethoxylates, ethoxylated 2-ethylhexanol, ethoxylated seed oils, butanol caped ethoxylated 2-ethylhexanol and mixtures thereof. Most preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodonium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride and dimethyl ditallow ammonium chloride. Most preferred cationic surfactant includes dimethyl ditallow ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the method of making a liquid laundry detergent formulation of the present invention, comprises: selecting a cleaning booster of Formula (I). More preferably, the method of making a liquid laundry detergent formulation of the present invention, comprises: selecting a cleaning booster of Formula (I), wherein x is 3 to 10 (preferably, 4 to 7; more preferably, 4 to 6; most preferably, 5); wherein y is 5 to 20 (preferably, 7 to 18; more preferably, 8 to 17; most preferably, 9 to 15); wherein z is 5 to 30 (preferably, 9 to 30; more preferably, 10 to 28; most preferably, 16 to 26); wherein x+y+z≥18 (preferably, 20 to 60; more preferably, 21 to 28; still more preferably, 24 to 60; most preferably, 35 to 60); wherein x≠z; wherein each R is a $C_{7-9}$ alkyl group (preferably, a $C_8$ alkyl group; more preferably, a branched 2-ethylhexyl group), wherein ≥75 wt % (preferably, 80 to 100 wt %; more preferably, 90 to 100 wt %; still more preferably, 95 to 100 wt %; yet more preferably, 98 to 100 wt %; still yet more preferably, 99 to 100 wt %; most preferably, 99.5 to 100 wt %) of the R groups are branched; wherein the selected cleaning booster of Formula (I) is selected based its cleaning boosting properties. Still more preferably, the method of making a liquid laundry detergent formulation of the present invention, comprises: selecting a cleaning booster of Formula (I), wherein x is 3 to 10 (preferably, 4 to 7; more preferably, 4 to 6; most preferably, 5); wherein y is 5 to 20 (preferably, 7 to 18; more preferably, 8 to 17; most preferably, 9 to 15); wherein z is 5 to 30 (preferably, 9 to 30; more preferably, 10 to 28; most preferably, 16 to 26); wherein x+y+z≥18 (preferably, 20 to 60; more preferably, 21 to 28; still more preferably, 24 to 60; most preferably, 35 to 60); wherein x≠z; wherein each R is a $C_{7-9}$ alkyl group (preferably, a $C_8$ alkyl group; more preferably, a branched 2-ethylhexyl group), wherein ≥75 wt % (preferably, 80 to 100 wt %; more preferably, 90 to 100 wt %; still more preferably, 95 to 100 wt %; yet more preferably, 98 to 100 wt %; still yet more preferably, 99 to 100 wt %; most preferably, 99.5 to 100 wt %) of the R groups are branched; wherein the selected cleaning booster of Formula (I) is selected based its cleaning boosting properties; and wherein the selected cleaning booster of formula (I) is provided in sufficient quantity such that the liquid laundry detergent provided comprises 0.01 to 25 wt % (preferably, 1 to 10 wt %; more preferably, 2.5 to 7.5 wt %; most preferably 4 to 6 wt %), based on weight of the liquid laundry detergent formulation, of the selected cleaning booster of Formula (I). Still yet more preferably, the method of making a liquid laundry detergent formulation of the present invention, comprises: selecting a cleaning booster of Formula (I), wherein 80 to 100 wt % (preferably, 90 to 100 wt %; more preferably, 95 to 100 wt %; still more preferably, 98 to 100 wt %; yet more preferably, 99 to 100 wt %; most preferably, 99.5 to 100 wt %) of the cleaning booster of Formula (I) is of Formula (II)

(II)

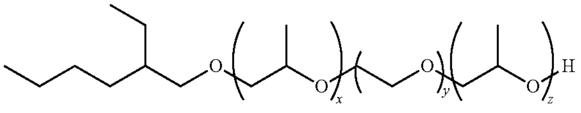

wherein x is 3 to 10 (preferably, 4 to 7; more preferably, 4 to 6; most preferably, 5); wherein y is 5 to 20 (preferably, 7 to 18; more preferably, 8 to 17; most preferably, 9 to 15); wherein z is 5 to 30 (preferably, 9 to 30; more preferably, 10 to 28; most preferably, 16 to 26); wherein x+y+z≥18 (preferably, 20 to 60; more preferably, 21 to 28; still more preferably, 24 to 60; most preferably, 35 to 60) and wherein x≠z; wherein the selected cleaning booster of Formula (I) is selected based its cleaning boosting properties; and wherein the selected cleaning booster of Formula (I) is provided in sufficient quantity such that the liquid laundry detergent provided comprises 0.01 to 25 wt % (preferably, 1 to 10 wt %; more preferably, 2.5 to 7.5 wt %; most preferably 4 to 6 wt %), based on weight of the liquid laundry detergent formulation, of the selected cleaning booster of Formula (I). Most preferably, the method of making a liquid laundry detergent formulation of the present invention, comprises:

selecting a cleaning booster of Formula (I), wherein 80 to 100 wt % (preferably, 90 to 100 wt %; more preferably, 95 to 100 wt %; still more preferably, 98 to 100 wt %; yet more preferably, 99 to 100 wt %; most preferably, 99.5 to 100 wt %) of the cleaning booster of Formula (I) is of Formula (II); wherein x is 3 to 10 (preferably, 4 to 7; more preferably, 4 to 6; most preferably, 5); wherein y is 5 to 20 (preferably, 7 to 18; more preferably, 8 to 17; most preferably, 9 to 15); wherein z is 5 to 30 (preferably, 9 to 30; more preferably, 10 to 28; most preferably, 16 to 26); wherein $x+y+z \geq 18$ (preferably, 20 to 60; more preferably, 21 to 28; still more preferably, 24 to 60; most preferably, 35 to 60); wherein $x \neq z$ and wherein $y<z$; wherein the selected cleaning booster of Formula (I) is selected based its cleaning boosting properties; and wherein the selected cleaning booster of Formula (I) is provided in sufficient quantity such that the liquid laundry detergent provided comprises 0.01 to 25 wt % (preferably, 1 to 10 wt %; more preferably, 2.5 to 7.5 wt %; most preferably 4 to 6 wt %), based on weight of the liquid laundry detergent formulation, of a cleaning booster of Formula (I).

Preferably, the method of making a laundry detergent formulation of the present invention optionally further comprises providing an additive selected from the group consisting of solvents (e.g., ethanol, propylene glycol); builders (e.g., sodium bicarbonate, sodium carbonate, zeolites, sodium citrate, sodium tripolyphosphate and aminocarboxylates (such as methylglycine diacetic acid, sodium salt or glutamic acid diacetic acid, sodium salt)); hydrotropes (e.g., sodium xylene sulfonate); foam control agents (e.g., fatty acids, polydimethylsiloxane); enzymes (e.g., protease, cellulases, lipase, amylase, mannanases); preservatives; perfumes (e.g., essential oils such as D-limonene); fluorescent whitening agents; bleach (e.g., sodium percarbonate, sodium perborate, sodium hypochlorite); dyes; additive polymers (e.g., dispersant polymers such as acrylic acid homopolymers and copolymers of acrylic acid with maleic acid, sulfonated monomer and/or ethyl acrylate); and mixtures thereof; and adding the additive to the liquid carrier, the cleaning surfactant and the selected cleaning booster of Formula (I) (preferably, of Formula (II)) to provide the liquid laundry detergent formulation.

Preferably, the method of making a liquid laundry detergent formulation of the present invention, further comprises providing an organic solvent; and adding the organic solvent to the liquid carrier, the cleaning surfactant and the selected cleaning booster of Formula (I) (preferably, of Formula (II)) to provide the liquid laundry detergent formulation. More preferably, the method of making a liquid laundry detergent formulation of the present invention, further comprises providing an organic solvent; and adding the organic solvent to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 50 wt % (preferably, 0.5 to 25 wt %; more preferably, 1 to 15 wt %; most preferably, 2.5 to 10 wt %), based on weight of the liquid laundry detergent formulation, of the organic solvent. Still more preferable, method of making a liquid laundry detergent formulation of the present invention, further comprises providing an organic solvent; and adding the organic solvent to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 50 wt % (preferably, 0.5 to 25 wt %; more preferably, 1 to 15 wt %; most preferably, 2.5 to 10 wt %), based on weight of the liquid laundry detergent formulation, of an organic solvent; wherein the organic solvent is selected from the group consisting of ethanol; propylene glycol; glycerol; 1,3-butanediol; 1,3-hexanediol; dipropylene glycol and mixtures thereof. Most preferably, method of making a liquid laundry detergent formulation of the present invention, further comprises providing an organic solvent; and adding the organic solvent to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 50 wt % (preferably, 0.5 to 25 wt %; more preferably, 1 to 15 wt %; most preferably, 2.5 to 10 wt %), based on weight of the liquid laundry detergent formulation, of the organic solvent; wherein the organic solvent is a mixture of ethanol and propylene glycol.

Preferably, method of making a liquid laundry detergent formulation of the present invention, further comprises providing a hydrotrope; and adding the hydrotrope to the liquid carrier, the cleaning surfactant and the selected cleaning booster of Formula (I) (preferably, of Formula (II)) to provide the liquid laundry detergent formulation. More preferably, method of making a liquid laundry detergent formulation of the present invention, further comprises providing a hydrotrope; and adding the hydrotrope to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 10 wt % (preferably, 0.1 to 10 wt %; more preferably, 0.2 to 8 wt %; most preferably, 0.5 to 7.5 wt %), based on the weight of the liquid laundry detergent formulation, of the hydrotrope. Still more preferably, method of making a liquid laundry detergent formulation of the present invention, further comprises providing a hydrotrope; and adding the hydrotrope to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 10 wt % (preferably, 0.1 to 10 wt %; more preferably, 0.2 to 8 wt %; most preferably, 0.5 to 7.5 wt %), based on the weight of the liquid laundry detergent formulation, of the hydrotrope; wherein the hydrotrope is selected from the group consisting of alkyl hydroxides; glycols; urea; monoethanolamine; diethanolamine; triethanolamine; calcium, sodium, potassium, ammonium and alkanol ammonium salts of xylene sulfonic acid, toluene sulfonic acid, ethylbenzene sulfonic acid, naphthalene sulfonic acid and cumene sulfonic acid; salts thereof and mixtures thereof. Yet more preferably, method of making a liquid laundry detergent formulation of the present invention, further comprises providing a hydrotrope; and adding the hydrotrope to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 10 wt % (preferably, 0.1 to 10 wt %; more preferably, 0.2 to 8 wt %; most preferably, 0.5 to 7.5 wt %), based on the weight of the liquid laundry detergent formulation, of the hydrotrope; wherein the hydrotrope is selected from the group consisting of sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof. Most preferably, method of making a liquid laundry detergent formulation of the present invention, further comprises providing a hydrotrope; and adding the hydrotrope to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 10 wt % (preferably, 0.1 to 10 wt %; more preferably, 0.2 to 8 wt %; most preferably, 0.5 to 7.5 wt %), based on the weight of the liquid laundry detergent formulation, of the hydrotrope; wherein the hydrotrope is sodium xylene sulfonate.

Preferably, method of making a liquid laundry detergent formulation of the present invention, further comprises providing a builder; and adding the builder to the liquid carrier, the cleaning surfactant and the selected cleaning booster of Formula (I) (preferably, of Formula (II)) to provide the liquid laundry detergent formulation. More preferably, method of making a liquid laundry detergent formulation of the present invention, further comprises providing a builder; and adding the builder to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 30 wt % (preferably, 1 to 20 wt %; more preferably, 2.5 to 10 wt %), based on the weight of the liquid laundry detergent formulation, of the builder. Still more preferably, method of making a liquid laundry detergent formulation of the present invention, further comprises providing a builder; and adding the builder to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 30 wt % (preferably, 1 to 25 wt %; more preferably, 2.5 to 10 wt %), based on the weight of the liquid laundry detergent formulation, of the builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylenephosphonic acid; salts of ethylenediaminetetraethylenephosphonic acid; oligomeric phosphonates; polymeric phosphonates; mixtures thereof. Most preferably, method of making a liquid laundry detergent formulation of the present invention, further comprises providing a builder; and adding the builder to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 30 wt % 0 to 30 wt % (preferably, 1 to 25 wt %; more preferably, 2.5 to 10 wt %), based on the weight of the liquid laundry detergent formulation, of the builder; wherein the builder includes sodium citrate.

Preferably, method of making a liquid laundry detergent formulation of the present invention, further comprises providing a structurant; and adding the structurant to the liquid carrier, the cleaning surfactant and the selected cleaning booster of Formula (I) (preferably, of Formula (II)) to provide the liquid laundry detergent formulation. More preferably, method of making a liquid laundry detergent formulation of the present invention, further comprises providing a structurant; and adding the structurant to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 2 wt % (preferably, 0.05 to 0.8 wt %; more preferably, 0.1 to 0.4 wt %), based on weight of the liquid laundry detergent formulation, of the structurant. Most preferably, method of making a liquid laundry detergent formulation of the present invention, further comprises providing a structurant; and adding the structurant to the liquid carrier, the cleaning surfactant and the selected cleaning booster of Formula (I) (preferably, of Formula (II)) to provide the liquid laundry detergent formulation; wherein the liquid laundry detergent formulation of the present invention, further comprises 0 to 2 wt % (preferably, 0.05 to 0.8 wt %; more preferably, 0.1 to 0.4 wt %), based on weight of the liquid laundry detergent formulation, of the structurant; wherein the structurant is a non-polymeric, crystalline hydroxy-functional materials capable of forming thread like structuring systems throughout the liquid laundry detergent formulation when crystallized in situ.

Preferably, method of making a liquid laundry detergent formulation of the present invention, further comprises providing a fragrance; and adding the fragrance to the liquid carrier, the cleaning surfactant and the selected cleaning booster of Formula (I) (preferably, of Formula (II)) to provide the liquid laundry detergent formulation. More preferably, method of making a liquid laundry detergent formulation of the present invention, further comprises providing a fragrance; and adding the fragrance to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 10 wt % (preferably, 0.001 to 5 wt %; more preferably, 0.005 to 3 wt %; most preferably, 0.01 to 2.5 wt %), based on the weight of the liquid laundry detergent formulation, of the fragrance.

Preferably, method of making a liquid laundry detergent formulation of the present invention, further comprises providing a fabric softener; and adding the fabric softener to the liquid carrier, the cleaning surfactant and the selected cleaning booster of Formula (I) (preferably, of Formula (II)) to provide the liquid laundry detergent formulation. More preferably, method of making a liquid laundry detergent formulation of the present invention, further comprises providing a fabric softener; and adding the fabric softener to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 10 wt % (preferably, 0.5 to 10 wt %), based on the weight of the liquid laundry detergent formulation, of the fabric softener. Most preferably, method of making a liquid laundry detergent formulation of the present invention, further comprises providing a fabric softener; and adding the fabric softener to the liquid carrier, the cleaning surfactant and the selected cleaning booster of Formula (I) (preferably, of Formula (II)) to provide the liquid laundry detergent formulation; wherein the liquid laundry detergent formulation provided contains 0 to 10 wt % (preferably, 0.5 to 10 wt %), based on the weight of the liquid laundry detergent formulation, of the fabric softener; wherein the fabric softener is a cationic coacervating polymer (e.g., cationic hydroxyl ethyl cellulose; polyquaternium polymers and combinations thereof).

Preferably, method of making a liquid laundry detergent formulation of the present invention, further comprises adjusting the pH of the liquid laundry detergent formulation provided by adding a pH adjusting agent to the liquid carrier, the cleaning surfactant and the selected cleaning booster of Formula (I) (preferably, of Formula (II)). More preferably, the method of making a liquid laundry detergent formulation of the present invention, further comprising adjusting the pH of the liquid laundry detergent formulation provided by adding a pH adjusting agent to the liquid carrier, the cleaning surfactant and the selected cleaning booster of Formula (I) (preferably, of Formula (II)); wherein the liquid laundry detergent formulation provided has a pH of 6 to 12.5 (preferably, 6.5 to 11; more preferably, 7.5 to 10). Bases for adjusting pH include mineral bases such as sodium hydroxide (including soda ash) and potassium hydroxide; sodium bicarbonate; sodium silicate; ammonium hydroxide; and organic bases (e.g., mono-, di- or tri-ethanolamine; and 2-dimethylamino-2-methyl-1-propanol (DMAMP)). Acids to adjust the pH include mineral acids (e.g., hydrochloric acid, phosphorus acid and sulfuric acid) and organic acids (e.g., acetic acid).

Preferably, the method of washing a fabric article of the present invention, comprises: providing a soiled fabric article (preferably, wherein the soiled fabric article is soiled with oil and glay soil; more preferably, wherein the soiled fabric article is soiled with sebum oils and clay soil)(preferably, wherein the soiled fabric article is selected from the group consisting of stained polyester fabric, stained polyester cotton blend fabric, stained cotton terry fabric, stained cotton interlock and mixtures thereof, more preferably, wherein the soiled fabric article is at least one of stained polyester fabric and stained polyester cotton blend fabric); providing a liquid laundry detergent formulation of the present invention; providing a wash water; and applying the wash water and the liquid laundry detergent formulation to the soiled fabric to provide a cleaned fabric article; wherein the wash water is at a temperature of ≤35° C. (preferably, 10 to 35° C.; more preferably, 15 to 30° C.; most preferably, 20 to 25° C.). More preferably, the method of washing a fabric article of the present invention, comprises: providing a soiled fabric article (preferably, wherein the soiled fabric article is soiled with oil and glay soil; more preferably, wherein the soiled fabric article is soiled with sebum oils and clay soil)(preferably, wherein the soiled fabric article is selected from the group consisting of stained polyester fabric, stained polyester cotton blend fabric, stained cotton terry fabric, stained cotton interlock and mixtures thereof, more preferably, wherein the soiled fabric article is at least one of stained polyester fabric and stained polyester cotton blend fabric); providing a liquid laundry detergent formulation of the present invention; providing a wash water; providing a rinse water; applying the wash water and the liquid laundry detergent formulation to the soiled fabric to provide a cleaned fabric article; wherein the wash water is at a temperature of ≤35° C. (preferably, 10 to 35° C.; more preferably, 15 to 30° C.; most preferably, 20 to 25° C.); and then applying the rinse water to the cleaned fabric article to remove the liquid laundry detergent formulation from the cleaned fabric article.

Some embodiments of the present invention will now be described in detail in the following Examples.

Synthesis S1: Cleaning Booster

To a nine liter reactor was charged 2-ethylhexanol (780.0 g) and 85% potassium hydroxide pellets (10.81 g). The reactor contents were then purged of nitrogen. A vacuum of was then gradually applied to the reactor contents over two hours to 100 mm mercury. A sample of the reactor contents (15.8 g) was withdrawn from the reactor and measured for water content by Karl Fisher titration. A water content of 411 parts per million by weight (ppm) was observed. The reactor contents were then pressurized to 110 to 139 kPa at 25° C. seven times with dry nitrogen to remove oxygen from the reactor headspace. The reactor contents were then heated with agitation to 130° C. Then propylene oxide (1,660 g) was charged to the reactor contents over a period of 4 hours. The reactor contents were then held at 130° C. with agitation for an additional 2 hours. The reactor contents were then cooled to 60° C. A sample of the reactor contents (142.9 g) was withdrawn. The reactor contents were then heated to 130° C. and ethylene oxide (2,070 g) was charged to the reactor over 4 hours. The reactor contents were then held at 130° C. with agitation for an additional 2 hours. The reactor contents were then cooled to 60° C. A sample of the reactor contents (142.9 g) was withdrawn. The reactor contents were then heated to 130° C. and propylene oxide (1,475 g) was charged to the reactor over 4 hours. The reactor contents were then held at 130° C. with agitation for an additional 2 hours. The reactor contents were then cooled to 60° C. The reactor contents were then neutralize with acetic acid in 10% aqueous solution to achieve a pH of 4-8 to provide the cleaning booster of Comparative Example C1.

Syntheses S2-S14: Cleaning Booster

Synthesis S1 was repeated in Syntheses S2-S14 adjusting the amount of the propylene oxide (PO) and ethylene oxide (EO) feeds to provide the appropriate mole ratios of PO and EO in the product cleaning booster obtained. Each of the product cleaning boosters prepared were of Formula (II)

(II)

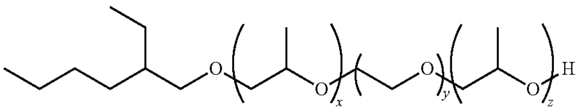

with the values of x, y and z as noted in TABLE 1.

TABLE 1

| | Cleaning Booster | | |
|---|---|---|---|
| Synthesis | POx | EOy | POz |
| S1 | 5 | 9 | 5 |
| S2 | 5 | 9 | 0 |
| S3 | 5 | 9 | 10 |
| S4 | 5 | 9 | 15 |
| S5 | 5 | 6 | 0 |
| S6 | 5 | 6 | 3 |
| S7 | 5 | 6 | 5 |
| S8 | 5 | 6 | 10 |
| S9 | 5 | 14 | 0 |
| S10 | 5 | 14 | 10 |
| S11 | 5 | 14 | 15 |
| S12 | 5 | 14 | 17.5 |
| S13 | 5 | 14 | 20 |
| S14 | 5 | 15 | 25 |

Comparative Examples C1-C7 and Examples 1-8: Liquid Laundry Detergent

The liquid laundry detergent formulations used in the deposition tests in the subsequent Examples were prepared having the generic formulation as described in TABLE 2 with the cleaning booster as noted in TABLE 3 and were prepared by standard liquid laundry formulation preparation procedures.

| Ingredient | Commercial Name | wt % |
|---|---|---|
| Linear alkyl benzene sulfonate | Nacconal 90G* | 16.0 |
| Sodium lauryl ethoxysulfate | Steol CS-460 | 4.0 |
| Ethanol | — | 2.0 |
| Propylene glycol | — | 5.0 |
| Non-ionic surfactant | Biosoft N25-7* | 5.0 |
| Anionic surfactant | Stepanate SXS-93* | 5.5 |
| Fatty acid | Prifac 7908[a] | 3.0 |
| Sodium citrate | — | 5.0 |
| Cleaning booster | TABLE 2 | 5.0 |
| Neutralization to pH 8.5 | | |
| Deionized water | — | QS to 100 |

*available from Stepan Company
[a]available from Croda.

TABLE 3

| Example | Cleaning booster |
|---|---|
| Comparative Example C1 | Biosoft 25-9* |
| Comparative Example C2 | Synthesis S1 |
| Comparative Example C3 | Synthesis S2 |
| Comparative Example C4 | Synthesis S5 |
| Comparative Example C5 | Synthesis S6 |
| Comparative Example C6 | Synthesis S7 |
| Comparative Example C7 | Synthesis S9 |
| Example 1 | Synthesis S3 |
| Example 2 | Synthesis S4 |
| Example 3 | Synthesis S8 |
| Example 4 | Synthesis S10 |
| Example 5 | Synthesis S11 |
| Example 6 | Synthesis S12 |
| Example 7 | Synthesis S13 |
| Example 8 | Synthesis S14 |

*linear alcohol ($C_{12-15}$) ethoxylate, with 9 moles of EO available from Stepan Company Primary Cleaning Performance Test The primary cleaning performance of the liquid laundry detergent formulations of Comparative Examples C1-C7 and Examples 1-8 were assessed in a Launder-Ometer (SDL Atlas, Model M228AA) at a set test temperature of 22° C. using a 30 minute wash cycle with 20 of the 1.2 liter canisters used for each run. The washed fabrics were rinsed in 300 mL of 100 ppm (2/1 $Ca^{2+}/Mg^{2+}$) hardness adjusted water at ambient temperature for 5 minutes at 260 osc/min in an Eberbach E6000 reciprocal shaker. The stained fabrics and soiled ballasts used in the tests were PCS-S-132 high discriminative sebum BEY pigment and PCS-S-94 sebum/dust ASTM stains from Testfabrics stitched to a pre-shrunk cotton interlock fabric. The size of the cotton interlock was 5×5 cm. The stained swatches were 2.5×3 cm. One 5×5 cm cut SBL-CFT soil ballast was added to each canister to provide baseline soil to the wash solution. The water hardness used for the studies was adjusted to 100,000 ppm as $CaCO_3$ (2:1 $Ca^{2+}$:$Mg^{2+}$ molar ratio) and checked by EDTA titration to confirm. The total surfactant concentration in the wash liquor was 200 ppm.

Reflectance Measurement and Stain Removal Index (SRI)

The soil removal index (SRI) for each of the Liquid Laundry Detergent formulations evaluated in Primary Cleaning Performance Test were determined using ASTM Method D4265-14. The average SRI taken from 8 swatches per condition (two swatches per pot, 4 pots) is provided in TABLE 4.

The L*, a* and b* values of the stained fabrics were measured pre and post wash with a Mach 5 spectrophotometer from Colour Consult. The L*, a* and b* values for the unwashed, unstained polycotton fabric was measured in the SRI calculations as follows:

$$SRI = \frac{(\Delta E^*_{(US-UF)} - \Delta E^*_{(WS-UF)})}{\Delta E^*_{(US-UF)}} \times 100$$

wherein US is the unwashed stain area, UF is the unwashed (unstained) fabric area, WS is the washed stain area, $\Delta E^*_{(US-UF)}$ is the $\Delta E^*$ color difference between the unwashed stain and the unwashed fabric and $\Delta E^*_{(WS-UF)}$ is the $\Delta E^*$ color difference between the washed stain and the unwashed fabric. The value of $\Delta E^*$ is calculated as $$\Delta E^* = (\Delta L^{*2} + \Delta a^{*2} + \Delta b^{*2})^{1/2}$$

The ΔSRI values provided in TABLE 4 give the difference between the SRI measured for the noted example relative to the SRI measured for Comparative Example C1. A positive value indicates an increase in soil removal relative to Comparative Example C1.

TABLE 4

| | | ΔSRI | |
|---|---|---|---|
| Example | Cleaning Booster | PCS-94 | PCS-132 |
| Comparative Example C2 | Synthesis S1 | 2.76 | 0.99 |
| Comparative Example C3 | Synthesis S2 | −0.43 | −0.91 |
| Comparative Example C4 | Synthesis S5 | −1.46 | −1.93 |
| Comparative Example C5 | Synthesis S6 | 1.15 | −0.78 |
| Comparative Example C6 | Synthesis S7 | 1.12 | −0.14 |
| Comparative Example C7 | Synthesis S9 | −1.30 | −1.74 |
| Example 1 | Synthesis S3 | 3.85 | 1.77 |
| Example 2 | Synthesis S4 | 3.84 | 0.64 |
| Example 3 | Synthesis S8 | 3.43 | 0.57 |
| Example 4 | Synthesis S10 | 3.52 | 0.88 |
| Example 5 | Synthesis S11 | −0.12 | −0.84 |
| Example 6 | Synthesis S12 | 6.18 | 1.88 |
| Example 7 | Synthesis S13 | 4.87 | 2.06 |
| Example 8 | Synthesis S14 | 6.11 | 2.36 |

Comparative Examples C8-C10 and Example 9: Liquid Laundry Detergent

The liquid laundry detergent formulations used in the cleaning tests in the subsequent Examples were prepared having the generic formulation as described in TABLE 5 with the cleaning booster polymer as noted in TABLE 6 and were prepared by standard liquid laundry formulation preparation procedures.

TABLE 5

| Ingredient | Commercial Name | wt % |
|---|---|---|
| Linear alkyl benzene sulfonate | Nacconal 90G* | 10.0 |
| Sodium lauryl ethoxysulfate | Steol CS-460* | 3.0 |
| Seconday alcohol ethoxylate | Tergitol ™ 15-S-9[a] | 3.0 |
| Cleaning Booster polymer | — | 2.0 |
| Deionized water | — | QS to 100 |

*available from Stepan Company
[a]available from The Dow Chemical Company

TABLE 6

| Example | Cleaning Booster Polymer |
|---|---|
| Comp. Ex. C8 | no cleaning booster polymer |
| Comp. Ex. C9 | antiredeposition polymer[1] |
| Comp. Ex. C10 | ethoxylated poly(ethyleneimine)[2] |
| Example 9 | Synthesis S13 |

[1]available from The Dow Chemical Company under tradename Acusol ™ 845
[2]available from BASF under tradename Sokolan ™ HP-20

Anti-Redeposition

The anti-redeposition on performance of the Liquid laundry detergent formulations of Comparative Examples C8-C10 and Example 9 were assessed in a Terg-o-tometer Model 7243ES agitated at 90 cycles per minute with the conditions noted in TABLE 7.

TABLE 7

| Parameter | Setting |
|---|---|
| Temperature | 25° C. |
| Water hardness | 200 ppm, $Ca^{2+}/Mg^{2+} = 2/1$ |
| Fabric Types | Cotton Terry (CT)<br>Cotton (C)<br>Polyester: cotton blend (PB)<br>Cotton interlock (CI)<br>Polyester (P)<br>Rayon (R)<br>two cloths of each type in each pot |
| Wash time | 12 minutes |
| Rinse time | 3 minutes |
| Liquid laundry detergent dosage | 0.5 g/L |
| Anti-redeposition soils | 0.25 g/L dust sebum<br>0.63 g/L Redart clay |
| Drying | After final rinse, fabrics were dried in a food dehydrator for 45 minutes |

The fabrics were laundered for 5 consecutive cycles and the whiteness index was measured at 460 nm using a HunderLab UltraScan VIS Colorimeter to determine fabric whiteness in accordance with ASTM E313. The whiteness index for the neat unwashed fabrics was used as the positive control. The change in the whiteness index relative to the positive control for each of the liquid laundry formulations are provided in TABLE 8.

TABLE 8

| | Delta in Whiteness Index | | | | | |
|---|---|---|---|---|---|---|
| Example | CT | C | PB | CI | P | R |
| Comp. Ex. C8 | −75.3 | −52.5 | −44.7 | −57.9 | −49.1 | −63.9 |
| Comp. Ex. C9 | −44.8 | −53.4 | −31.7 | −37.6 | −30.4 | −55.3 |
| Comp. Ex. C10 | −52.0 | −47.4 | −23.8 | −37.2 | −31.7 | −47.1 |
| Ex. 9 | −32.3 | −53.3 | −17.5 | −33.3 | −5.9 | −47.1 |

We claim:

1. A method of making a liquid laundry detergent formulation, comprising:

providing a liquid carrier, wherein the liquid carrier comprises water;

providing a cleaning surfactant, wherein the cleaning surfactant consists of a mixture of an anionic surfactant and a nonionic surfactant, wherein the anionic surfactant is selected from the group consisting of alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof; and wherein the nonionic surfactant is a secondary alcohol ethoxylate; and selecting a cleaning booster of Formula (I)

(I)

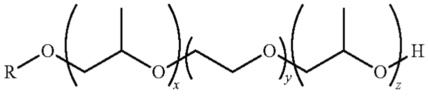

wherein x is 3 to 10; wherein y is 5 to 20; wherein z is 5 to 30; wherein x+y+z≥18; wherein x≠z; wherein each R is a $C_{7-9}$ alkyl group, wherein ≥75 wt % of the R groups are branched;

wherein 99.5 to 100 wt % of the selected cleaning booster of Formula (I) is of Formula (II)

(II)

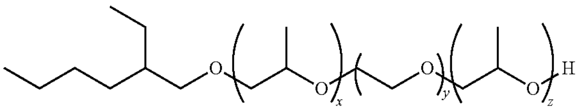

wherein x is 5; wherein v is 9 to 15 and wherein z is 16 to 26;

providing the selected cleaning booster of Formula (I); and combining the liquid carrier, the cleaning surfactant and the selected cleaning booster of Formula (I) to provide the liquid laundry detergent formulation.

2. The method of claim 1, wherein the liquid laundry detergent formulation provided comprises 15 to 97.99 wt %, based on weight of the liquid laundry detergent formulation, of the liquid carrier;

2 to 60 wt %, based on weight of the liquid laundry detergent formulation, of the cleaning surfactant; and 0.01 to 25 wt %, based on weight of the liquid laundry detergent formulation, of the selected cleaning booster of Formula (I).

3. The method of claim 2 further comprising:

providing an organic solvent;

providing a hydrotrope;

providing a builder; and adding the organic solvent, the hydrotrope and the builder to the liquid carrier, the cleaning surfactant and the selected cleaning booster of Formula (II) to provide the liquid laundry detergent formulation.

4. The method of claim 2, wherein the anionic surfactant is selected from the group consisting of $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-10}$ alkyl polyethoxy sulfates and mixtures thereof.

5. The method of claim 2, wherein the anionic surfactant is selected from the group consisting of $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate, $C_{12-16}$ alkyl polyethoxy sulfate and mixtures thereof.

6. The method of claim 2, wherein the anionic surfactant is a mixture of linear alkyl benzene sulfonate and sodium lauryl ethoxysulfate.

7. The method of claim 6, wherein 83.6 wt % of the cleaning surfactant is anionic surfactant.

8. A method of washing a fabric article, comprising: providing a soiled fabric article; providing a liquid laundry detergent formulation made by the method of claim 1; providing a wash water; and applying the wash water and the liquid laundry detergent formulation to the soiled fabric to provide a cleaned fabric article; wherein the wash water is at a temperature of ≤35° C.

9. A method of making a liquid laundry detergent formulation, consisting of:

providing a liquid carrier, wherein the liquid carrier is water;

providing a cleaning surfactant, wherein the cleaning surfactant consists of a mixture of an anionic surfactant and a nonionic surfactant, wherein the anionic surfactant is selected from the group consisting of alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof; and wherein the nonionic surfactant is a secondary alcohol ethoxylate; and selecting a cleaning booster of Formula (I)

(I)

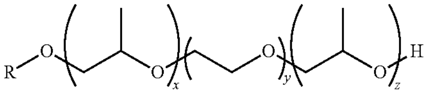

wherein x is 3 to 10; wherein y is 5 to 20; wherein z is 5 to 30; wherein x+y+z≥18; wherein x≠z; wherein each R is a $C_{7-9}$ alkyl group, wherein ≥75 wt % of the R groups are branched;

wherein 99.5 to 100 wt % of the selected cleaning booster of Formula (I) is of Formula (II)

(II)

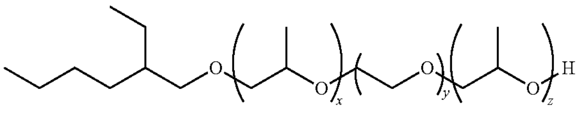

wherein x is 5; wherein y is 9 to 15 and wherein z is 16 to 26;

providing the selected cleaning booster of Formula (I);

optionally providing an additive selected from the group consisting of an organic solvent selected from the group consisting of ethanol and propylene glycol;

a builder selected from the group consisting of sodium bicarbonate, sodium carbonate, zeolites, sodium citrate, sodium tripolyphosphate and aminocarboxylates;

a hydrotrope, wherein the hydrotrope is sodium xylene sulfonate;

a foam control agent selected from a fatty acid and a polydimethylsiloxane;

an enzyme selected from the group consisting of protease, cellulase, lipase, amylase and mannanases;

a preservative;

a perfume;

a fluorescent whitening agent;

a bleach selected from sodium percarbonate, sodium perborate and sodium hypochlorite;

a dye;

an additive polymer;

and mixtures thereof; and adding the optional additive to the liquid carrier, the cleaning surfactant and the selected cleaning booster of Formula (I) to provide the liquid laundry detergent formulation.

10. The method of claim 9, wherein the anionic surfactant is selected from the group consisting of $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-10}$ alkyl polyethoxy sulfates and mixtures thereof.

11. The method of claim 9, wherein the anionic surfactant is selected from the group consisting of $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate, $C_{12-16}$ alkyl polyethoxy sulfate and mixtures thereof.

12. The method of claim 9, wherein the anionic surfactant is a mixture of linear alkyl benzene sulfonate and sodium lauryl ethoxysulfate.

13. The method of claim 12 wherein 83.6 wt % of the cleaning surfactant is anionic surfactant.

* * * * *